United States Patent
Ly et al.

(10) Patent No.: US 11,399,395 B2
(45) Date of Patent: Jul. 26, 2022

(54) TECHNIQUES FOR PERFORMING RANDOM ACCESS IN FULL DUPLEX WIRELESS COMMUNICATIONS

(71) Applicant: QUALCOMM Incorporated, San Diego, CA (US)

(72) Inventors: Hung Dinh Ly, San Diego, CA (US); June Namgoong, San Diego, CA (US); Muhammad Sayed Khairy Abdelghaffar, San Jose, CA (US); Krishna Kiran Mukkavilli, San Diego, CA (US); Tingfang Ji, San Diego, CA (US); Huilin Xu, San Diego, CA (US); Shimman Arvind Patel, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 19 days.

(21) Appl. No.: 17/005,020

(22) Filed: Aug. 27, 2020

(65) Prior Publication Data

US 2021/0084688 A1 Mar. 18, 2021

Related U.S. Application Data

(60) Provisional application No. 62/902,343, filed on Sep. 18, 2019.

(51) Int. Cl.
*H04W 74/08* (2009.01)
*H04L 5/14* (2006.01)
(Continued)

(52) U.S. Cl.
CPC .......... *H04W 74/0833* (2013.01); *H04L 5/14* (2013.01); *H04W 24/10* (2013.01); *H04W 52/36* (2013.01); *H04W 76/27* (2018.02)

(58) Field of Classification Search
None
See application file for complete search history.

(56) References Cited

U.S. PATENT DOCUMENTS

2012/0307717 A1  12/2012  Worrall et al.
2018/0199328 A1* 7/2018  Sang ..................... H04L 5/0048
(Continued)

FOREIGN PATENT DOCUMENTS

CN    111294927 A  *  6/2020  .......... H04L 5/0053
CN    112087805 A  *  12/2020

OTHER PUBLICATIONS

Sabharwal et al. "In-Band Full-Duplex Wireless: Challenges and Opportunities" dated May 2014, https://arxiv.org/pdf/1311.0456.pdf (Year: 2014).*

(Continued)

*Primary Examiner* — Jamaal Henson
(74) *Attorney, Agent, or Firm* — Arent Fox LLP

(57) ABSTRACT

Aspects described herein relate to determining whether full duplex (FD) communications are configured during resources for communicating one or more messages of a random access procedure, where the FD communications comprising uplink communications and downlink communications occurring in a same frequency band, and responsive to the determining whether the FD communications are configured during the resources, transmitting the one or more messages of the random access procedure using the resources.

28 Claims, 6 Drawing Sheets

(51) Int. Cl.
    *H04W 52/36*     (2009.01)
    *H04W 24/10*     (2009.01)
    *H04W 76/27*     (2018.01)

(56)         References Cited

U.S. PATENT DOCUMENTS

2018/0255464 A1*   9/2018   Fodor ................... H04W 16/10
2019/0104544 A1*   4/2019   Axnäs ................ H04W 74/004
2020/0266908 A1*   8/2020   Qian ................... H04L 27/2613

OTHER PUBLICATIONS

International Search Report and Written Opinion—PCT/US2020/048576—ISA/EPO—dated Oct. 30, 2020.
Lee H, et al., "Impact of Time and Frequency Misalignments in OFDM Based In-Band Full-Duplex Systems," 2017 IEEE Wireless Communications and Networking Conference (WCNC) IEEE, Mar. 19, 2017 (Mar. 19, 2017), pp. 1-6, XP033095806, DOI: 10.1109/WCNC.2017.7925763 [retrieved on May 10, 2017], the whole document.

* cited by examiner

TECHNIQUES FOR PERFORMING RANDOM ACCESS IN FULL DUPLEX WIRELESS COMMUNICATIONS

CLAIM OF PRIORITY UNDER 35 U.S.C. § 119

The present application for patent claims priority to Provisional Patent Application No. 62/902,343, entitled "TECHNIQUES FOR PERFORMING RANDOM ACCESS IN FULL DUPLEX WIRELESS COMMUNICATIONS" filed Sep. 18, 2019, which is assigned to the assignee hereof and hereby expressly incorporated by reference herein for all purposes.

BACKGROUND

Aspects of the present disclosure relate generally to wireless communication systems, and more particularly, to performing a random access procedure.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information.

In some wireless communication technologies, user equipment (UE) can perform a random access procedure to initiate establishing a connection with an access point for receiving access to a wireless network. The UE can communicate one or more random access messages, such as a random access preamble and/or a random access payload, over time and/or frequency resources that are configured for random access. The UE can receive a response to the random access request and/or contention resolution information from the access point. In addition, in some wireless communication technologies, a UE and/or an access point can be configured for full duplex (FD) communications where the UE and/or access point can concurrently transmit and receive over wireless communication resources within the same frequency band or within the same component carrier.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes determining whether full duplex (FD) communications are configured during resources for communicating one or more messages of a random access procedure, the FD communications comprising uplink communications and downlink communications occurring in a same frequency band or in a same component carrier, and responsive to the determining whether the FD communications are configured during the resources, transmitting the one or more messages of the random access procedure using the resources.

In another aspect, a method of wireless communication is provided that includes determining whether to configure FD communications during resources for communicating, with a user equipment (UE), one or more messages of a random access procedure, the FD communications comprising uplink communications and downlink communications occurring in a same frequency band or in a same component carrier, and responsive to the determining whether to configure the FD communications during the resources, communicating at least one of one or more messages of the random access procedure.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
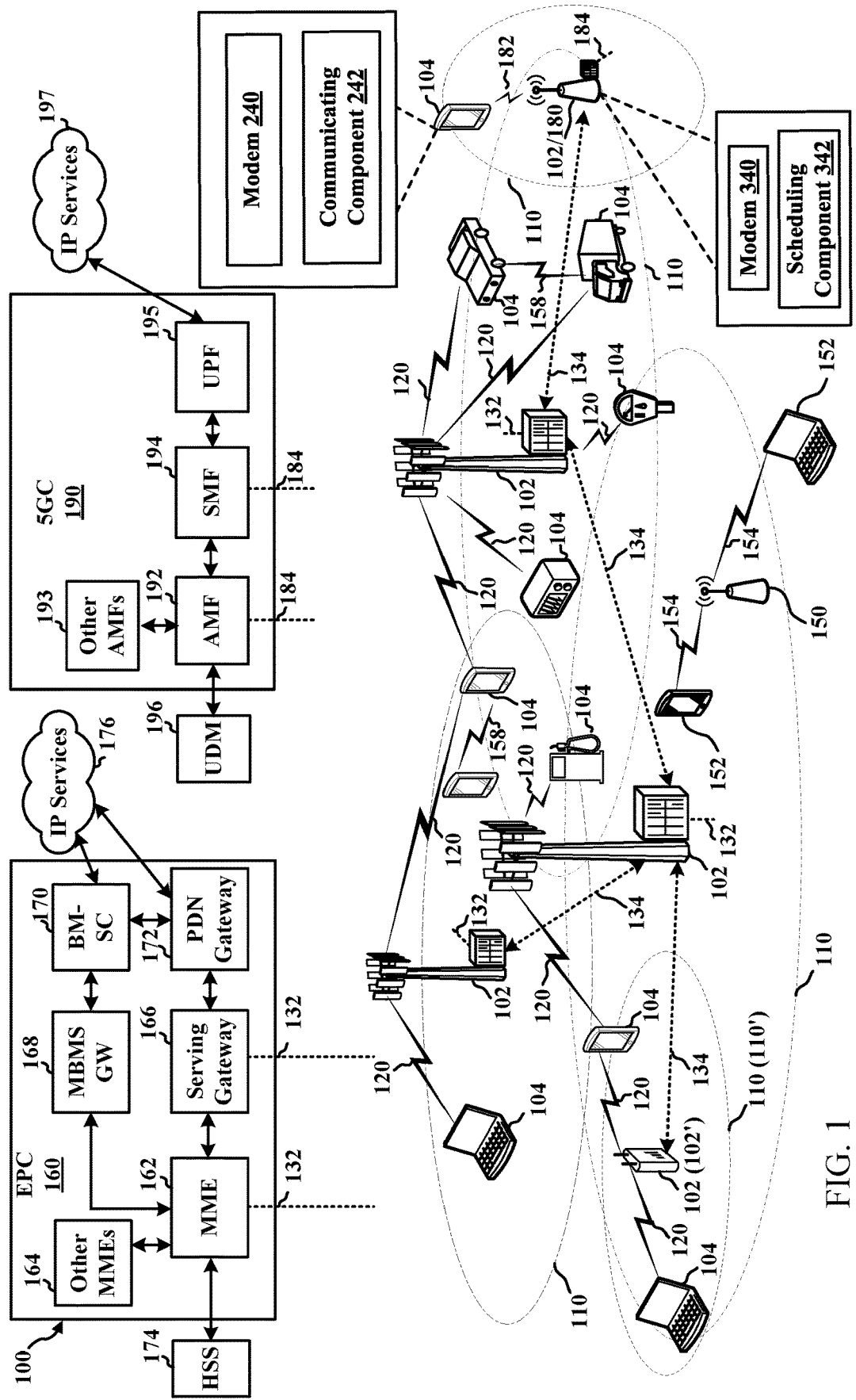
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to performing a random access procedure based on determining whether full duplex (FD) communications are configured. For example, a device that determines to transmit a random access preamble can determine whether FD communications are configured over the resources defined for transmitting the random access preamble. If so, the device can determine to use one or more different parameter values for transmitting the random access preamble where FD communications are configured than if FD communications are not configured. For example, the different parameter value(s) may include values for an initial transmit power for the random access preamble, a power ramping step for retransmitting the random access preamble, etc. In another example, the device can determine the different parameter value(s) of or relating to a random access format or configuration (e.g., for transmitting the random access preamble) based on whether FD communications are configured over the resources. In another example, the device can determine whether FD communications are configured over resources defined for transmitting and/or retransmitting a payload in the random access procedure. In either case, for example, the device can determine whether FD communications are configured over the resources (and/or can determine the different parameter value(s) and/or whether to use the different parameter values) based on at least one of a received configuration, a determined radio resource control (RRC) state, a determined service type, a signal measurement of signals received from an access point, and/or the like. Moreover, the device can determine whether a response message in the random access procedure is to be received over resources configured for FD communications, and if so, can refrain from transmitting or reduce transmit power over the resources.

Similarly, for example, an access point that configures random access opportunities or related resources for devices can expect to receive messages in the random access procedure based on whether the access point configures FD communications over the resources or not. For example, the access point may determine a random access format or configuration based on whether the access point configured FD communications over the resources. In addition, for example, the access point can configure the device with an indication of whether FD communications are configured over the resources or parameters for determining such. In one example, the access point can determine to not configure FD communications over resources including or at least overlapping resources defined for random access communications. In another example, the access point can determine to configure (and/or indicate configuration of) FD communications over resources including or at least overlapping resources defined for random access communication.

FD communications, as referred to herein, can include a single node (e.g., a user equipment (UE) or access point) transmitting and receiving (e.g., concurrently) over communication resources in the same frequency band and/or over communication resources in the same component carrier (CC). In one example, FD communications can include in-band full duplex (IBFD) where the single node can transmit and receive on the same time and frequency resource, and the downlink and uplink can share the same IBFD time/frequency resources (e.g., full and/or partial overlap). In another example, FD communications can include sub-band FD (also referred to as "flexible duplex") where the single node can transmit and receive at the same time but on different frequency resources within the same frequency band (or over communication resources in the same CC), where the downlink resource and the uplink resources can be separated in the frequency domain (e.g., by a guard band). For example, the guard band in sub-band FD can be on the order of resource block (RB) widths (e.g., 180 kilohertz (KHz) for third generation partnership project (3GPP) long term evolution (LTE) and fifth generation (5G) new radio (NR), 360 and 720 KHz for NR, etc.). This can be distinguished from a guard band in frequency division duplexing (FDD) communications defined in LTE and NR, which can be 5 megahertz (MHz) or more, and the associated resources in FDD are defined between frequency bands, but not within the same frequency band (or resources in the same CC) as is the case in sub-band FD communications.

In some examples of FD communications, various antenna configurations can be used within a device (e.g., an access point or UE) to facilitate FD communications. In one configuration, a transmit antenna array can be spatially separated from a receive antenna array within the device to reduce leakage (e.g., self-interference) from the transmit antenna array into the receive antenna array. In another example, the antenna array configuration of non-FD communications can use the same antenna array(s) for transmitting or receiving (but not both).

Moreover, a random access procedure can refer to a random access channel (RACH) procedure as defined in LTE and/or NR, such as a four-step RACH procedure, a two-step RACH procedure, etc. For example, a four-step RACH procedure can include a UE transmitting a first message (MSG1) over a physical RACH (PRACH) physical layer (PHY) channel, where the first message can include a PRACH preamble transmitted in a configured RACH occasion. The four-step RACH procedure can include an access point transmitting a second message (MSG2), in response to MSG1, over a physical downlink control channel (PDCCH) or physical downlink shared channel (PDSCH) as a random access response (RAR) including a timing advance, an uplink grant for a third message (MSG3), a temporary cell radio network temporary identifier (TC-RNTI), etc. The four-step RACH procedure can include the UE transmitting MSG3, in response to MSG2, over a physical uplink shared channel (PUSCH) including a radio resource control (RRC) connection request, a scheduling request, a buffer status, etc. The four-step RACH procedure can include the access point transmitting a fourth message (MSG4), in response to MSG3, over PDCCH or PDSCH including a contention resolution message. In another example, a two-step RACH procedure can include the UE transmitting a first message (MSG-A) that can include a RACH preamble and PUSCH payload, and the access point transmitting a second message (MSG-B), in response to MSG-A, including RAR and/or contention resolution message.

In addition, for example, the UE can be configured to use RACH in various cases, such as in requesting initial access with the access point, transitioning from one RRC state to another with the access point (e.g., from RRC IDLE/INACTIVE to RRC CONNECTED), performing RACH to a target cell during handover, transmitting small uplink data in RRC IDLE/INACTIVE without necessarily transitioning to RRC CONNECTED, performing beam failure recovery, etc.

In any case, in these or other examples, random access procedures can be improved based on the device and/or access point being able to determine whether FD communications are configured over random access resources and accordingly taking actions based on this determination. For example, the device and/or access point can determine to not use random access resources that overlap with those configured for FD communications, improve signal quality and/or hearability for random access communications over resources configured for FD communications, use different formats or configurations for random access communications over resources configured for FD communications, etc., as described further herein.

The described features will be presented in more detail below with reference to FIGS. 1-6.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for performing random access procedures based on determining whether corresponding resources are also configured for FD communications. In addition, some nodes may have a modem 340 and scheduling component 342 for configuring resources for random access procedures and/or for FD communications, as described herein. Though a UE 104 is shown as having the modem 240 and communicating component 242 and a base station 102 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 can configure resources for performing random access procedure with a base station 102 and/or performing FD communications by the base station 102 and/or one or more UEs 104. Scheduling component 342 may configure one or more parameters for determining whether FD communications are scheduled during random access resources. In an example, communicating component 242 can perform a random access procedure based on a determination of whether resources for the random access procedure are configured for FD communications. Communicating component 242 can determine whether the resources are configured for FD communications based on at least one of receiving a configuration indicating such, a RRC state, a service type of communications with a base station 102, a signal quality or power received from the base station 102, and/or the like. Communicating component 242 may accordingly modify a random access message based on the determination (e.g., modify one or more parameters, such as a transmit power, power ramping step, random access format or configuration, etc.).

Figure 2:
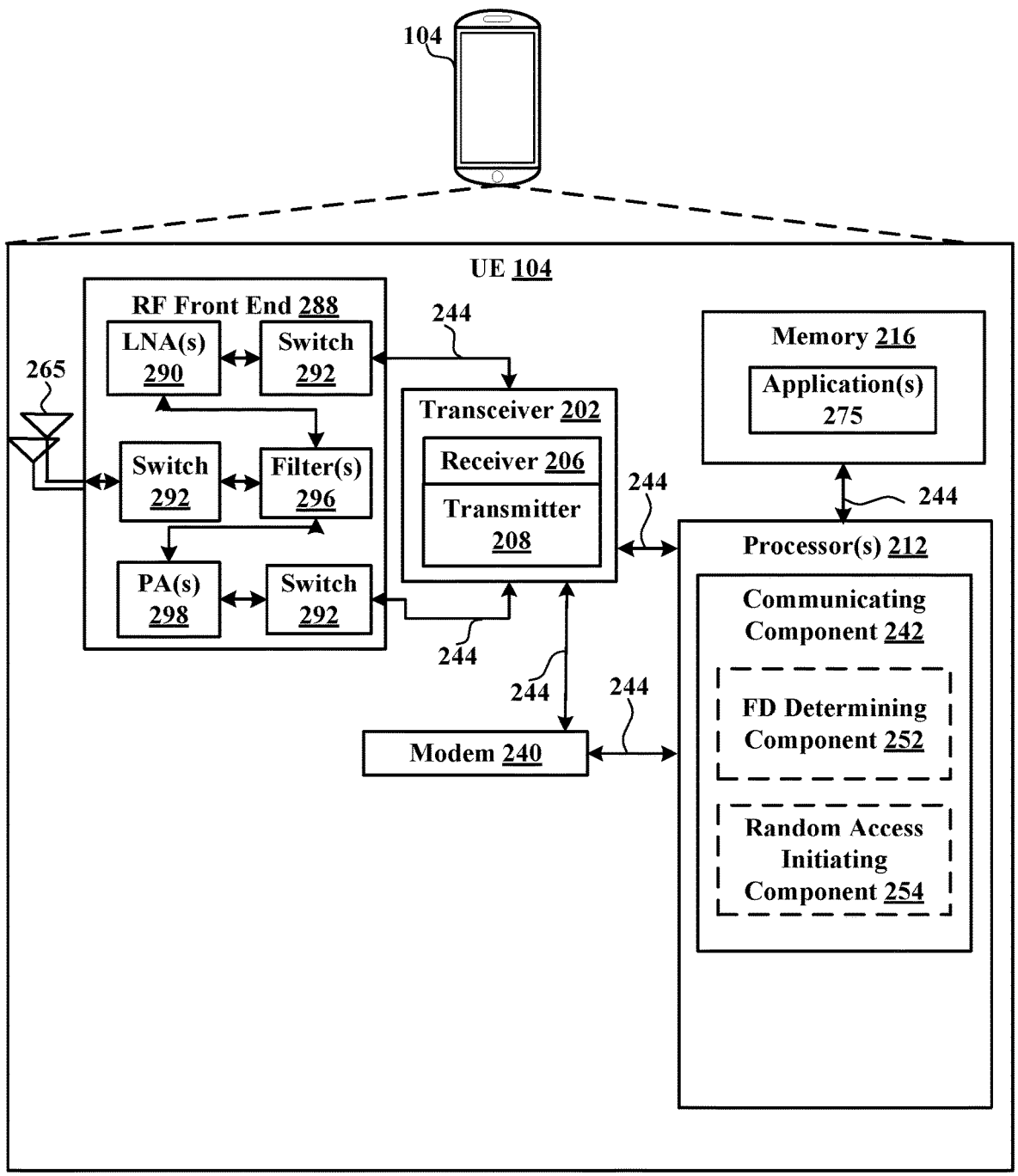
FIG. 2 is a block diagram illustrating an example of a UE, in accordance with various aspects of the present disclosure.
Figure 3:
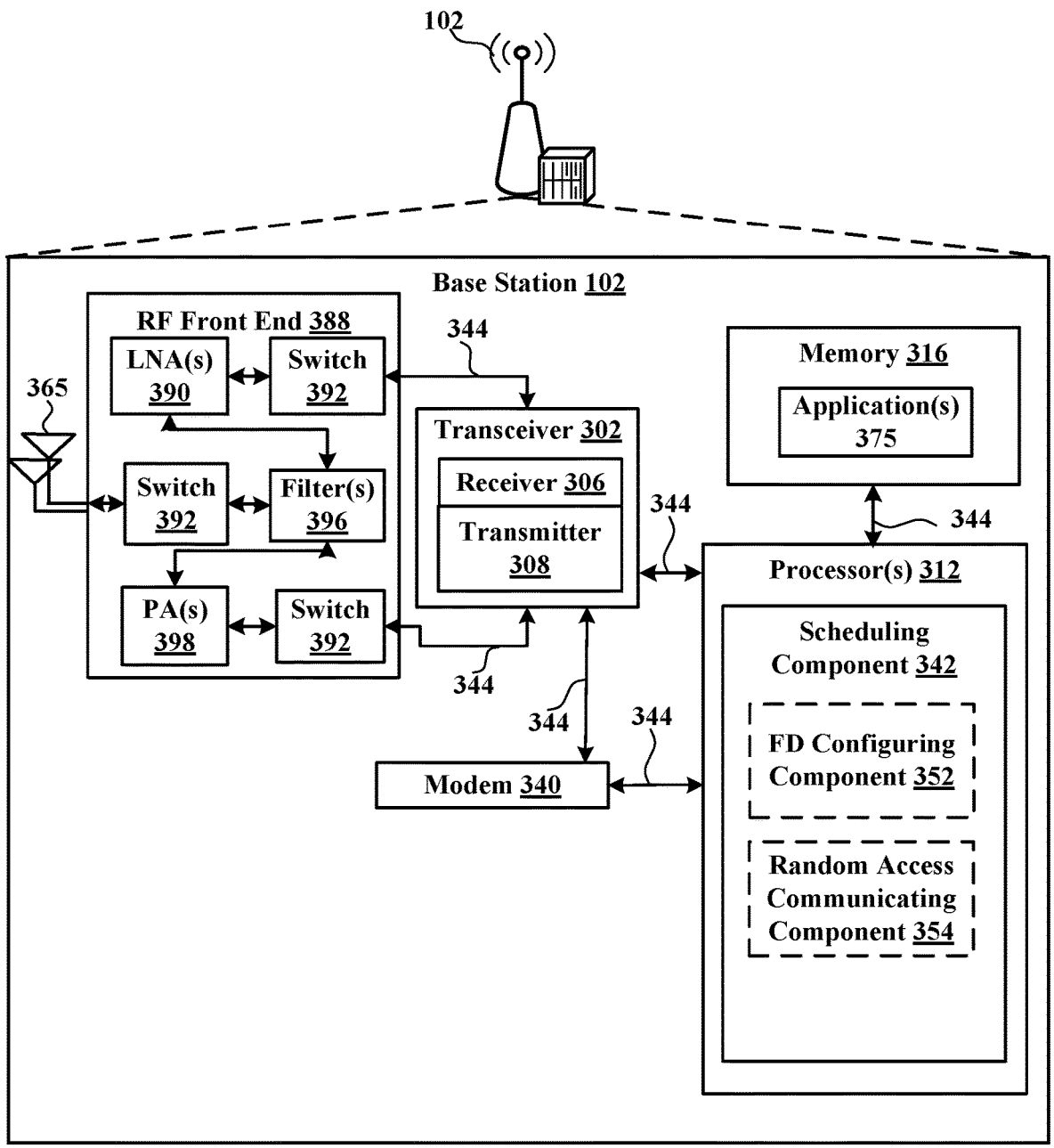
FIG. 3 is a block diagram illustrating an example of a base station, in accordance with various aspects of the present disclosure.
Figure 4:
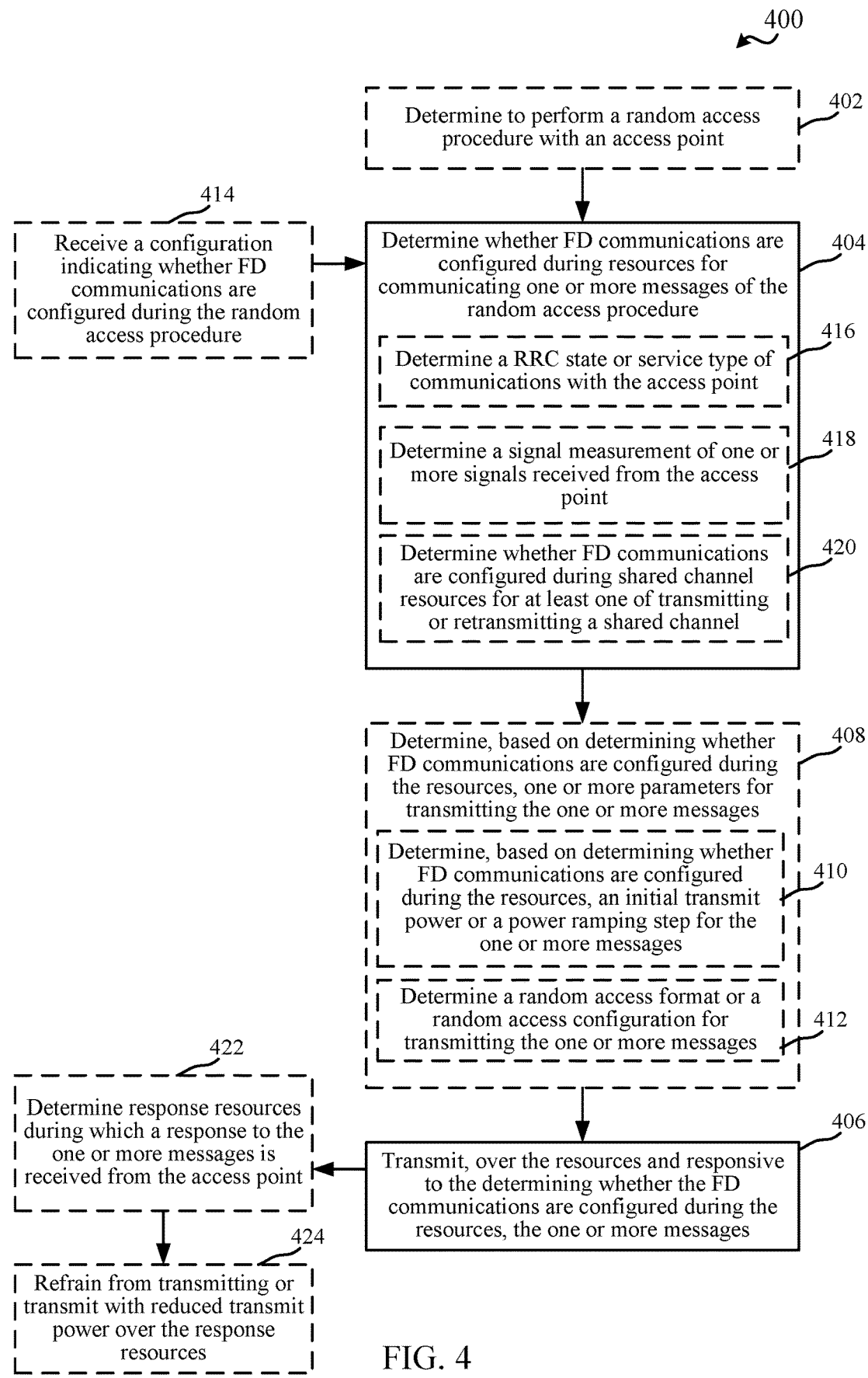
FIG. 4 is a flow chart illustrating an example of a method for performing a random access procedure based on determining whether full duplex (FD) communications are configured, in accordance with various aspects of the present disclosure.
Figure 5:
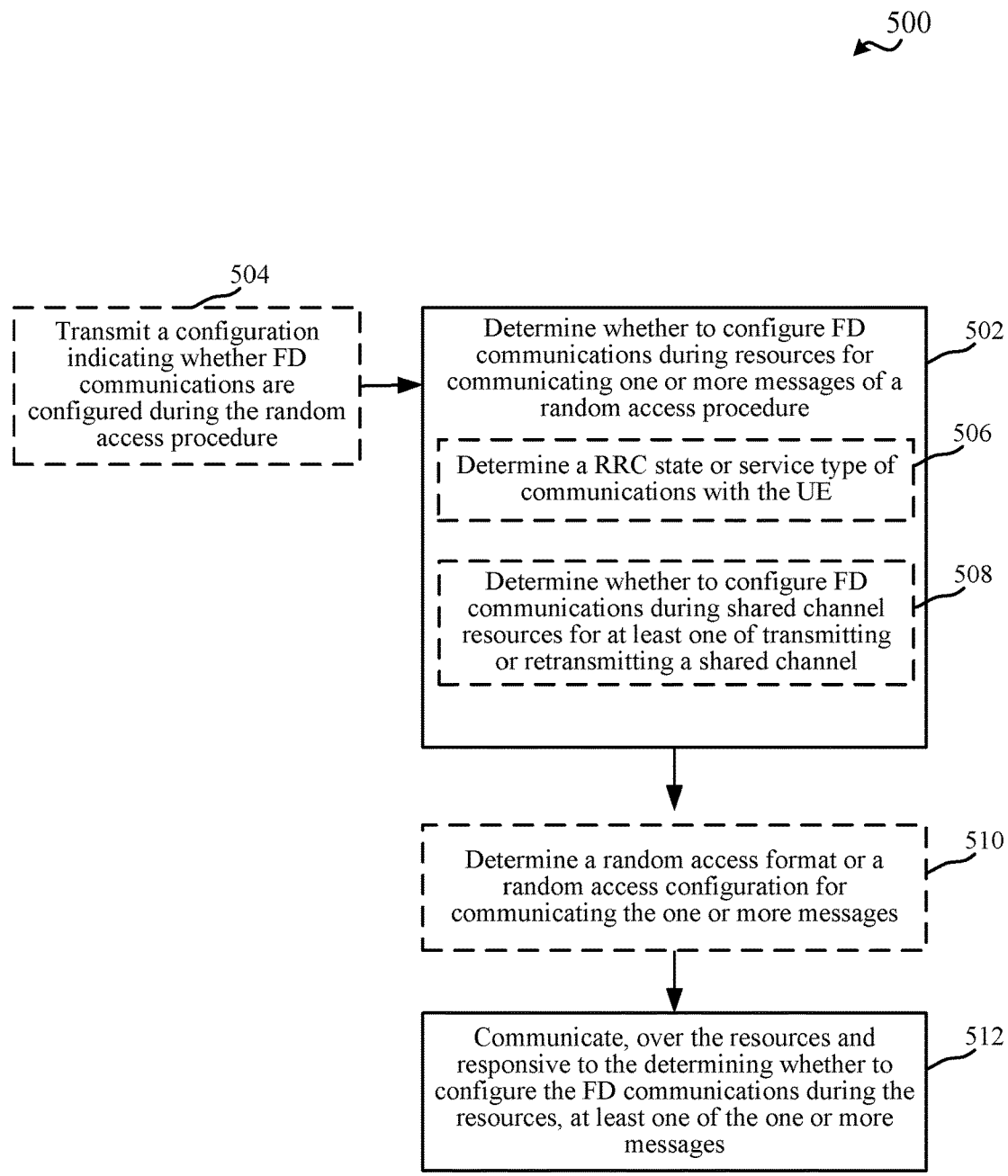
FIG. 5 is a flow chart illustrating an example of a method for configuring FD communications, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for performing random access procedures based on a determination of whether FD communications are configured over random access resources, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a FD determining component 252 for determining whether FD communications are configured over a set of resources related to a random access procedure, and/or a random access initiating component 254 for communicating one or more messages of a random access procedure (or other messages) based on whether FD communications are configured over the set of resources, as described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for configuring FD communications and/or resources for performing random access procedures, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a FD configuring component 352 for configuring FD communications by the base station 102 or one or more UEs 104 over certain resources, and/or a random access communicating component 354 for communicating one or more messages in a random access procedure based on whether FD communications are configured over the random access resources.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for performing a random access procedure based on determining whether resources are configured for FD communications. In an example, a UE 104 can perform the functions described in method 400 using one or more of the components described in FIGS. 1 and 2.

In method 400, optionally at Block 402, it can be determined to perform a random access procedure with an access point. In an aspect, random access initiating component 254, e.g., in conjunction with processor(s) 212, memory 216, transceiver 202, communicating component 242, etc., can determine to perform a random access procedure with an access point (e.g., base station 102). For example, random access initiating component 254 can determine to perform the random access procedure based on determining one or more scenarios configured to trigger the random access procedure. For example, as described, random access initiating component 254 can determine to perform the random access procedure based on determining to establish a connection with the access point as an initial access attempt, based on determining to transition from one RRC state to another (e.g., from RRC IDLE or RRC INACTIVE to RRC CONNECTED) with the access point, based on determining to handover to a target cell and accordingly perform the random access procedure with the target cell, based on determining to transmit small uplink data to the access point via a random access procedure (e.g., via the PUSCH payload of the random access procedure) without necessarily switching RRC state, based on determining to perform beam failure recovery after detecting failure to receive one or more beams from the access point, etc.

In addition, for example, in determining to perform the random access procedure, random access initiating component 254 can determine resources over which to communicate (e.g., transmit or receive) one or more messages of the random access procedure. For example, random access initiating component 254 can determine a random access occasion configured (e.g., by the access point) for transmitting a random access preamble to initiate the random access procedure, and can determine the time and frequency resources corresponding to the random access occasion. The resources can include time and frequency resources, such as a symbol (e.g., orthogonal frequency division multiplexing (OFDM) symbol) to use to transmit the random access preamble, a component carrier (CC) or frequency band to use to transmit the random access preamble, etc. In an example, a configuration received from the access point may indicate one or more of the time resources (e.g., the symbol) or the frequency resources (e.g., the CC) for the random access occasion and/or one or more of the time resources or frequency resources may be determined from other configurations. In addition, determining to perform the random access procedure may also include determining resources over which to possibly retransmit the random access preamble, resources over which to transmit another random access message, such as a payload message, resources over which to receive one or more random access messages, such as a RAR, contention resolution message, etc., and/or the like, as described further herein.

In method 400, at Block 404, it can be determined whether FD communications are configured during resources for communicating one or more messages of the random access procedure. In an aspect, FD determining component 252, e.g., in conjunction with processor(s) 212, memory 216, transceiver 202, communicating component 242, etc., can determine whether FD communications are configured during resources for communicating the one or more messages of the random access procedure. For example, FD determining component 252 can determine whether FD communications are configured for the UE 104 or the access point (e.g., base station 102) during resources for the random access procedure, which can include a determination of whether IBFD or sub-band FD communications are configured with full or partial overlap of the random access resources. In addition, for example, FD determining component 252 can determine whether FD communications are configured during one or more of resources for transmitting a random access preamble, resources for receiving a RAR, resources for transmitting a payload, etc. during the random access procedure.

For example, it may be possible that the access point configures FD communications during resources for random access procedures or the access point may avoid configuring FD communications during resources for random access procedures. In another example, whether FD communications are or can be configured during resources for random access procedure may depend on an RRC state of the UE 104, a service type of communications between the UE 104 and the access point, and/or the like, as described further herein.

In method 400, at Block 406, responsive to the determining whether the FD communications are configured during the resources, the one or more messages can be transmitted using/over the resources. In an aspect, random access initiating component 254, e.g., in conjunction with processor(s) 212, memory 216, transceiver 202, communicating component 242, etc., can transmit, over the resources and responsive to the determining whether the FD communications are configured during the resources, the one or more messages. In one example, if FD communications are configured during the resources, the one or more messages are transmitted using the resources, and the transmission of the one or more messages can be modified as described further herein to account for possible self-interference (at the UE 104 or the base station 102) that may be caused due to the FD communications. The transmissions can further be based on determining to perform the random access procedure. This can include determining an initial transmit power, a power-ramping step, a random access format or configuration, or other parameters based on whether FD communications are configured over the random access resources.

In method 400, optionally at Block 408, one or more parameters for transmitting the one or more messages can be determined based on determining whether FD communications are configured during the resources. In an aspect, random access initiating component 254, e.g., in conjunction with processor(s) 212, memory 216, transceiver 202, communicating component 242, etc., can determine, determine, based on determining whether FD communications are configured during the resources, one or more parameters (or parameter values) for transmitting the one or more messages. For example, the parameter(s) and/or related values can be different based on whether the one or more messages are to be transmitted in resources over which FD communications are configured or resources over which FD communications are not configured. Moreover, in an example, the parameter(s) and/or related values can be different based on a RRC state, a service type, or the scenario causing the RACH procedure (e.g., whether the RACH procedure is for initial access, RRC state transition, handover to a target cell, small uplink data transmission in RRC IDLE/INACTIVE, beam failure recovery, etc. Thus, in an example, random access initiating component 254 can determine the different parameter(s) and/or related values based on determining the scenario causing the RACH procedure. The one or more parameters or values may relate to transmit power for transmitting the one or more messages, a format or configuration for transmitting the one or more messages, etc., as described herein.

In determining the one or more parameters at Block 408, optionally at Block 410, an initial transmit power or a power ramping step for the one or more messages can be determined based on determining whether FD communications are configured during the resources. In an aspect, random access initiating component 254, e.g., in conjunction with processor(s) 212, memory 216, transceiver 202, communicating component 242, etc., can determine, based on determining whether FD communications are configured during the resources, the initial transmit power or the power ramping step for the one or more messages. For example, where it is determined the FD communications are configured during the resources, random access initiating component 254 can adjust an initial transmit power and/or a power ramping step for a random access preamble (e.g., also referred to as a PRACH). For example, the power ramping step can refer to an increase in transmit power between consecutively transmitted random access preambles where multiple random access preambles are transmitted, each with an increased transmit power. For example, the initial power and/or power ramping step can be initially configured at the UE 104 by a configuration received from the access point or parameters otherwise stored in memory 216 of the UE 104. In a specific example, where it is determined the FD communications are configured during the resources, random access initiating component 254 can increase the initial transmit power and/or power ramping step to compensate for possible self-interference cancellation efficiency than where it is determined that FD communications are not configured during the resources. In an example, UE 104 can receive a configuration from the access point that indicates an amount to increase the initial transmit power or the power ramping step in either case (and/or based on the scenario causing the RACH procedure) and/or parameters for determining an amount to increase the initial transmit power or the power ramping step in either case (and/or based on the scenario causing the RACH procedure).

In another example, in determining the one or more parameters at Block 408, optionally at Block 412, a random access format or a random access configuration for transmitting the one or more messages can be determined. In an aspect, random access initiating component 254, e.g., in conjunction with processor(s) 212, memory 216, transceiver 202, communicating component 242, etc., can determine a random access format or random access configuration for transmitting the one or more messages. As described, for example, random access initiating component 254 can determine the random access format or configuration based on determining whether FD communications are configured during the resources. For example, to support FD in OFDM symbols overlapping with ROs, a different PRACH format and/or configuration (e.g., a newly defined PRACH format and/or configuration) can be used when FD communications are configured to fit new uplink and/or downlink configurations in FD. RO configuration (e.g., as received from the access point) for FD case may be different from RO configuration for non-FD case. ROs for FD can be a subset of ROs currently defined in LTE and/or NR. PRACH parameter (e.g., PRACH format, PRACH configuration) for FD can be different from PRACH parameter for non-FD.

For example, a first PRACH format can be used where FD communications are configured, while a second PRACH format can be used where FD communications are not configured during random access resources. The first and second PRACH formats can be different. For example, in one PRACH format (e.g., a "long PRACH format"), more symbols can be used to transmit PRACH (e.g., where FD communications are configured), whereas in another PRACH format (e.g., a "short PRACH format"), less symbols can be used to transmit PRACH (e.g., where FD communications are not configured). In any case, for example, random access initiating component 254 can determine the random access configuration and/or format to use based on determining whether FD communications are configured during the random access resources. In an example, UE 104 can receive a configuration from the access point that indicates the random access configuration and/or format to use in either case (and/or based on the scenario causing the RACH procedure) and/or parameters for determining the random access configuration and/or format to use in either case (and/or based on the scenario causing the RACH procedure).

In method 400, optionally at Block 414, a configuration indicating whether FD communications are configured during the random access procedure can be received. In an aspect, FD determining component 252, e.g., in conjunction with processor(s) 212, memory 216, transceiver 202, communicating component 242, etc., can receive the configuration indicating whether FD communications are configured during the random access procedure. For example, FD determining component 252 can receive the configuration from the access point (e.g., base station 102) in system information (SI) or other broadcast signaling, RRC signaling, etc. For example, the configuration can indicate whether FD is configured at the access point in OFDM symbols overlapping random access occasions (ROs) or not. As such, for example, random access initiating component 254 can determine whether to adjust an initial transmit power or power ramping step, use a different random access format or configuration, etc. or take additional action based on whether the configuration indicates FD communications are configured during the random access resources.

In method 400, in determining whether FD communications are configured during the resources at Block 404, optionally at Block 416, a RRC state or service type of communications with the access point can be determined. In an aspect, FD determining component 252, e.g., in conjunction with processor(s) 212, memory 216, transceiver 202, communicating component 242, etc., can determine the RRC state or service type of communications with the access point, and/or can determine whether FD communications are configured based at least in part on the RRC state or service type. In this example, whether FD is configured at the access point in OFDM symbols overlapping with ROs or not can depend on the RRC states or service types. In one example, service types can include a first service type, such as enhanced mobile broadband (eMBB), a second service type that may have additional or more restrictive latency or reliability requirements (e.g., lower latency and/or higher reliability) than the first service type, such as ultra-reliable low latency communications (URLLC), etc. In an example, each of one or more service types may or may not allow FD communications to be configured in random access resources.

For example, FD determining component 252 can determine whether an RRC state is RRC IDLE or INACTIVE, RRC CONNECTED, etc., and can determine whether FD communications are configured based on the RRC state. In a specific example, FD determining component 252 can determine that FD may be configured for initial access RACH (e.g., for transitioning from RRC IDLE or INAC- TIVE to RRC CONNECTED), or not configured for RACH when in an RRC CONNECTED state (e.g., for handover or out-of-sync recovery due to uplink timing loss). More generally, in an example, FD determining component 252 can determine that FD communications may be configured during random access resources where the UE 104 is operating in a RRC IDLE or INACTIVE state and/or can determine that FD communications are not configured during random access resources where the UE 104 is operating in an RRC CONNECTED state. In another example, FD determining component 252 can determine whether a service type is eMBB or URLLC (or other service types) and can determine whether FD communications are configured based on the service type. For example, for RACH to a target cell during handover, FD determining component 252 can determine that FD may be configured for eMBB, or not configured for URLLC.

In method 400, in determining whether FD communications are configured during the resources at Block 404, optionally at Block 418, a signal measurement of one or more signals received from the access point can be determined. In an aspect, FD determining component 252, e.g., in conjunction with processor(s) 212, memory 216, transceiver 202, communicating component 242, etc., can determine a signal measurement of one or more signals received from the access point. For example, FD determining component 252 can determine the signal measurement, such as a reference signal received power (RSRP), path loss measurement, etc. of a signal from the access point, and can determine whether FD communications are configured during random access resources based on comparing the signal measurement to one or more thresholds. This may be useful for transmit power prioritization with respect to FD versus non-FD. This may also be applicable to RACH or other channels. In addition, in an example, the access point may configure parameters (e.g., in the configuration received from the access point described in Block 414) indicating a relationship between the signal measurement and an assumption that FD is configured over resources.

In method 400, in determining whether FD communications are configured during the resources at Block 404, optionally at Block 420, it can be determined whether FD communications are configured during shared channel resources for at least one of transmitting or retransmitting a shared channel. In an aspect, FD determining component 252, e.g., in conjunction with processor(s) 212, memory 216, transceiver 202, communicating component 242, etc., can determine whether FD communications are configured during shared channel resources for at least one of transmitting or retransmitting the shared channel. For example, in a four-step random access procedure, this determination and/or the shared channel resources can correspond to MSG3 transmitted after the random access preamble (e.g., MSG1). In a two-step random access procedure, this determination can correspond to transmitting at least a payload portion of MSG-A.

For example, it may be possible that the access point does not configure FD communications during resources for an initial shared channel (e.g., PUSCH) transmission or for shared channel retransmission. For example, the resources for initial shared channel transmission may be specified in the RAR and resources for shared channel retransmission may be specified in downlink control information (DCI) (e.g., DCI format 0_0 scrambled by TC-RNTI). In another example, it may be possible that the access point configures FD communications during resources for an initial shared channel (e.g., PUSCH) transmission but does not configure FD communications during resources for shared channel retransmission to provide higher protection for retransmission. Thus, in an example, FD determining component 252 can determine whether FD communications are configured based on determining whether the resources correspond to an initial shared channel transmission or a retransmission.

In yet another example, as described above, whether FD is configured for shared channel transmission in the random access procedure may also be based on RRC state and/or service type. Thus, in a specific example, FD may be configured for initial access RACH (e.g., RRC IDLE or INACTIVE to RRC CONNECTED), but not configured for RACH in RRC CONNECTED, and FD determining component 252 can determine whether FD communications are configured in the resources based on such. In addition, in a specific example, for RACH to target cell during handover, FD may be configured for one service type (e.g., eMBB) but not configured for another service type (e.g., URLLC), and FD determining component 252 can determine whether FD communications are configured in the resources based on the service type.

In method 400, optionally at Block 422, response resources during which a response to the one or more messages is received from the access point can be determined. In an aspect, random access initiating component 254, e.g., in conjunction with processor(s) 212, memory 216, transceiver 202, communicating component 242, etc., can determine the response resources during which a response to the one or more messages is received from the access point. For example, random access initiating component 254 can determine the response resources based on the random access configuration or indication of ROs, a determined period of time after which the random access preamble is transmitted, resources after transmitting the random access preamble until the response is received, etc. The response may include the RAR (e.g., MSG2), contention resolution message (e.g., MSG4), MSG-B in a two-step random access procedure, etc.

For example, for handover scenario in which UE can perform a RACH procedure to a target cell while sending PUCCH/PUSCH to source cell, if UE receives MSG2 or MSG4 (e.g., MSG-B) PDCCH/PDSCH from target cell, PUCCH/PUSCH transmission in FD during MSG2 or MSG4 (e.g., MSG-B) reception might have impact on PDCCH/PDSCH performance. Furthermore, coverage of broadcast channels may be limited due to wide beam (compared to narrow beam for unicast channels).

In method 400, optionally at Block 424, transmitting can be refrained from or can occur with reduced transmit power over the response resources. In an aspect, random access initiating component 254, e.g., in conjunction with processor(s) 212, memory 216, transceiver 202, communicating component 242, etc., can refrain from transmitting or transmit with reduced transmit power (e.g., to the access point or other devices) over the response resources, such to mitigate interference to the response where FD communications are configured at the UE 104. In one example, for symbols in which FD UE receives MSG2 or MSG4 (e.g., MSG-B) PDCCH/PDSCH in RRC CONNECTED, UE may not expect to be configured with uplink transmission. As such, for example, if uplink transmission is scheduled, random access initiating component 254 can refrain from transmitting uplink communications over the scheduled resources. In another example, the UE may transmit configured uplink communications at reduced transmission power, as described. In one example, the transmit power reduction can be configured to UE (e.g., by the access point) or determined by the UE in a configuration or hardcoded in memory (e.g., memory 216) based on a radio access technology specification or standard, etc.

FIG. 5 illustrates a flow chart of an example of a method 500 for configuring or refraining from configuring FD communications over random access resources. In an example, a base station 102 can perform the functions described in method 500 using one or more of the components described in FIGS. 1 and 3.

In method 500, at Block 502, it can be determined whether to configure FD communications during resources for communicating one or more messages of a random access procedure. In an aspect, FD configuring component 352, e.g., in conjunction with processor(s) 312, memory 316, transceiver 302, scheduling component 342, etc., can determine whether to configure FD communications during resources for communicating one or more messages of the random access procedure. For example, scheduling component 342 can configure resources for UEs to use in performing a random access procedure with base station 102. The configured random access resources can indicate ROs, random access preambles, etc. for the UEs to use in performing the random access procedure. Allowing FD communications during random access resources may have an impact on random access communications from UEs, and thus the base station 102 can determine whether to configure FD communications or not, and/or can indicate whether FD communications are configured during random access resources (e.g., where the FD communications may fully or partially overlap the random access resources in time as IBFD, sub-band FD, etc.).

For example, FD configuring component 352 can determine to not configure FD in OFDM symbols overlapping with ROs configured for one or more UEs, which can at least improve communications for cell-edge UEs. In another example, FD configuring component 352 can determine to configure FD in OFDM symbols overlapping with ROs configured for one or more UEs. In an example, whether to configure FD in OFDM symbols overlapping with ROs may be dependent on a network implementation.

In another example, in method 500, optionally at Block 504, a configuration indicating whether FD communications are configured during the random access procedure can be transmitted. In an aspect, FD configuring component 352, e.g., in conjunction with processor(s) 312, memory 316, transceiver 302, scheduling component 342, etc., can transmit the configuration (e.g., to one or more UEs, as described) indicating whether FD communications are configured during the random access procedure. In an example, FD configuring component 352 can transmit the configuration in SI broadcast signaling, RRC signaling, etc. In this example, as described, a UE 104 can receive the configuration and can adjust random access communication parameters (e.g., initial transmit power or power ramping step, random access format or configuration, etc.) based on an indication in the configuration as to whether FD communications are configured over the random access resources. In another example, the configuration may include parameters for determining whether FD communications are configured over random access resources, such as a threshold of a signal measurement of signals received from an access point (e.g., RSRP, path loss measurement, etc.) that can indicate FD communications are configured in the random access resources. In another example, the configuration may include the random access communication parameter values, parameters for determining the values, and/or the like.

In yet another example, in determining whether the configure FD communications during the resources at Block 502, optionally at Block 506, an RRC state or service type of communications with the UE can be determined. In an aspect, FD configuring component 352, e.g., in conjunction with processor(s) 312, memory 316, transceiver 302, scheduling component 342, etc., can determine the RRC state or service type of the communications with the UE (e.g., UE 104), and can determine whether to configure the FD communications in the resources based on the RRC state or service type. As described, in a specific example, FD may be configured for initial access RACH (e.g., RRC IDLE or INACTIVE to RRC CONNECTED), but not configured for RACH in RRC CONNECTED, and FD configuring component 352 can configure FD communications, or not, in the resources based on such. More generally, in an example, FD configuring component 352 can configure FD communications during random access resources where the UE 104 is operating in a RRC IDLE or INACTIVE state and/or can refrain from configuring FD communications during random access resources where the UE 104 is operating in an RRC CONNECTED state. In addition, in a specific example, for RACH to target cell during handover, FD may be configured for a first service type (e.g., eMBB) but not configured for another service type (e.g., URLLC or other service type with more restrictive latency and/or reliability requirements), and FD configuring component 352 can determine to configure FD communications, or not, in the resources based on the service type.

In yet another example, in determining whether to configure FD communications during the resources at Block 502, optionally at Block 508, it can be determined whether to configure FD communications during shared channel resources for at least one of transmitting or retransmitting a shared channel. In an aspect, FD configuring component 352, e.g., in conjunction with processor(s) 312, memory 316, transceiver 302, scheduling component 342, etc., can determine whether to configure FD communications during shared channel resources for at least one of transmitting or retransmitting the shared channel. For example, as described, FD configuring component 352 can determine not to configure FD communications for initial transmission and retransmissions of the shared channel (e.g., PUSCH). In another example, as described, FD configuring component 352 can determine not to configure FD communications for retransmissions of the shared channel but may configure FD communications over resources for initial transmission of the shared channel. In yet another example, as described, whether or not to configure FD communications over the resources for shared channel transmission/retransmission may be based on an RRC state or service type of communications with the UE.

In method 500, optionally at Block 510, a random access format or a random access configuration for communicating the one or more messages can be determined. In an aspect, random access communicating component 354, e.g., in conjunction with processor(s) 312, memory 316, transceiver 302, scheduling component 342, etc., can determine the random access format or the random access configuration for communicating the one or more messages. In an example, as described above, the determination of the random access format or configuration can also be based on whether FD communications are configured during the random access resources. In addition, as described above, the PRACH format/configuration may include a new format/configuration to fit new uplink/downlink configuration in FD. In addition, for example, the RO configuration for FD can be different than for non-FD and/or a PRACH parameter can be different FD than for non-FD (e.g., long PRACH format or more symbols for PRACH in FD than for PRACH in non-FD).

In method 500, at Block 512, at least one of the one or more messages can be communicated over the resources and responsive to the determining whether to configure FD communications during the resources. In an aspect, random access communicating component 354, e.g., in conjunction with processor(s) 312, memory 316, transceiver 302, scheduling component 342, etc., can communicate, over the resources and responsive to the determining whether to configure FD communications during the resources, at least one of the one or more messages. For example, random access communicating component 354 can communicate the one or more messages, which can include receiving a random access preamble transmitted based on whether FD communications are configured during the resources, as described, receiving a shared channel transmission and/or retransmission based on whether FD communications are configured during the resources, transmitting a RAR and/or contention resolution message based on whether FD communications are configured during the resources, and/or the like. In one example, communicating the one or more messages can be based on the determined random access format and/or configuration determined in Block 510. In another example, communicating the one or more messages can be with a selected transmit power or power ramping step, etc.

In yet another example, for initial access UEs, based on PRACH reception, random access communicating component 354 can determine to group UEs for interference mitigation. For example, random access communicating component 354 can adjust synchronization signal block (SSB) transmission so that the intended UE gets better SSB to PRACH association for communicating the one or more signals (e.g., PRACH preamble transmission, PUSCH transmission, MSG2 or MSG4 reception, etc.), at least where FD communications are configured during the random access resources.

Figure 6:
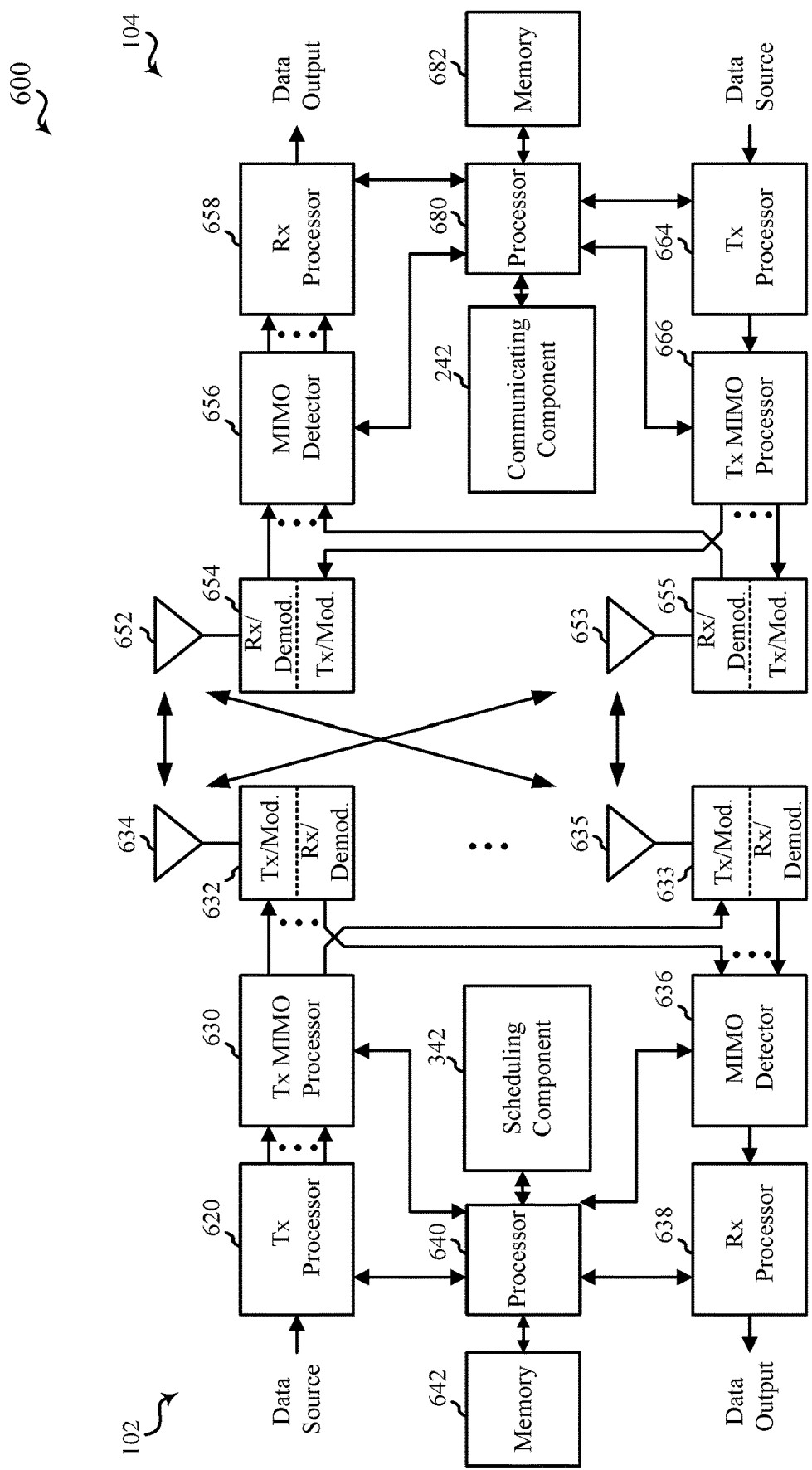
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104, in accordance with various aspects of the present disclosure. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   receiving an indication indicating whether full duplex (FD) communications are configured during resources for communicating one or more messages of a random access procedure, the FD communications comprising uplink communications and downlink communications occurring in a same frequency band or in a same component carrier; and
   where the indication indicates that the FD communications are configured during the resources, transmitting the one or more messages of the random access procedure, including a random access preamble, using the resources and using at least one of an initial transmit power or a power ramping step that is based on the indication.

2. The method of claim 1, wherein the indication indicates whether FD communications are configured during a random access occasion for transmitting the one or more messages.

3. The method of claim 2, wherein receiving the indication includes receiving the indication in a configuration from an access point indicating whether FD communications are configured during the random access occasion.

4. The method of claim 3, further comprising receiving the configuration from the access point in system information (SI) signaling or radio resource control (RRC) signaling.

5. The method of claim 1, wherein the indication includes a radio resource control (RRC) state of communications with an access point.

6. The method of claim 1, wherein the indication includes a service type of communications with an access point.

7. The method of claim 1, wherein the indication is based at least in part on a signal measurement of signals received from an access point.

8. The method of claim 7, wherein the indication includes a configuration from the access point that indicates a relationship between the signal measurement and whether FD communications are configured.

9. The method of claim 1, further comprising determining, where the indication indicates that FD communications are configured during the resources, at least one of a random access format or a random access configuration for transmitting the one or more messages.

10. The method of claim 9, wherein determining the random access configuration comprises determining at least one of:
    a random access occasion for transmitting the one or more messages as a random access preamble;
    whether to use one of a long random access format or a short random access format for transmitting the one or more messages as a random access preamble; or
    a number of symbols to use for transmitting the one or more messages as a random access preamble.

11. The method of claim 1, wherein the indication indicates whether FD communications are configured during at least one of shared channel resources for transmitting one or more messages including a shared channel in the random access procedure or one or more retransmission resources for retransmitting the one or more messages including the shared channel.

12. The method of claim 1, further comprising:
    determining response resources during which a response to the one or more messages is received from an access point; and
    at least one of refraining from transmitting communications to another access point during the response resources or reducing a transmit power for transmitting communications to another access point during the response resources based at least in part on the indication.

13. An apparatus for wireless communication, comprising:
    a transceiver;
    a memory configured to store instructions; and
    one or more processors communicatively coupled with the transceiver and the memory, wherein the one or more processors are configured to:
        receive an indication indicating whether full duplex (FD) communications are configured during resources for communicating one or more messages of a random access procedure, the FD communications comprising uplink communications and downlink communications occurring in a same frequency band or in a same component carrier; and
        where the indication indicates that the FD communications are configured during the resources, transmit the one or more messages of the random access procedure, including a random access preamble, using the resources and using at least one of an initial transmit power or a power ramping step that is based on the indication.

14. The apparatus of claim 13, wherein the indication indicates whether FD communications are configured during a random access occasion for transmitting the one or more messages.

15. The apparatus of claim 14, wherein the one or more processors are configured to receive the indication in a configuration received from an access point indicating whether FD communications are configured during the random access occasion.

16. The apparatus of claim 15, wherein the one or more processors are further configured to receive the configuration from the access point in system information (SI) signaling or radio resource control (RRC) signaling.

17. The apparatus of claim 13, wherein the indication includes a radio resource control (RRC) state of communications with an access point.

18. The apparatus of claim 13, wherein the indication includes a service type of communications with an access point.

19. The apparatus of claim 13, wherein the indication is based at least in part on a signal measurement of signals received from an access point.

20. The apparatus of claim 19, wherein the indication includes a configuration from the access point that indicates a relationship between the signal measurement and whether FD communications are configured.

21. The apparatus of claim 13, wherein the one or more processors are further configured to determine, where the indication indicates that FD communications are configured during the resources, at least one of a random access format or a random access configuration for transmitting the one or more messages.

22. The apparatus of claim 21, wherein the one or more processors are configured to determine the random access configuration at least in part by determining at least one of:
    a random access occasion for transmitting the one or more messages as a random access preamble;
    whether to use one of a long random access format or a short random access format for transmitting the one or more messages as a random access preamble; or
    a number of symbols to use for transmitting the one or more messages as a random access preamble.

23. The apparatus of claim 13, wherein the indication indicates whether FD communications are configured during at least one of shared channel resources for transmitting one or more messages including a shared channel in the random access procedure or one or more retransmission resources for retransmitting the one or more messages including the shared channel.

24. The apparatus of claim 13, wherein the one or more processors are configured to:
    determine response resources during which a response to the one or more messages is received from an access point; and
    at least one of refrain from transmitting communications to another access point during the response resources or reduce a transmit power for transmitting communications to another access point during the response resources based at least in part on the indication.

25. An apparatus for wireless communication, comprising:
    means for receiving an indication indicating whether full duplex (FD) communications are configured during resources for communicating one or more messages of a random access procedure, the FD communications comprising uplink communications and downlink communications occurring in a same frequency band or in a same component carrier; and
    means for, where the indication indicates that the FD communications are configured during the resources, transmitting the one or more messages of the random access procedure, including a random access preamble, using the resources and using at least one of an initial transmit power or a power ramping step that is based on the indication.

26. The apparatus of claim 25, wherein the indication indicates whether FD communications are configured during a random access occasion for transmitting the one or more messages.

27. A non-transitory computer-readable medium, comprising code executable by one or more processors for wireless communication, the code comprising code for:
receiving an indication indicating whether full duplex (FD) communications are configured during resources for communicating one or more messages of a random access procedure, the FD communications comprising uplink communications and downlink communications occurring in a same frequency band or in a same component carrier; and
where the indication indicates that the FD communications are configured during the resources, transmitting the one or more messages of the random access procedure, including a random access preamble, using the resources and using at least one of an initial transmit power or a power ramping step that is based on the indication.

28. The non-transitory computer-readable medium of claim 27, wherein the code for determining whether FD communications are configured during the resources determines whether FD communications are configured during a random access occasion for transmitting the one or more messages.

* * * * *